US009183232B1

(12) United States Patent
Giordano et al.

(10) Patent No.: US 9,183,232 B1
(45) Date of Patent: Nov. 10, 2015

(54) SYSTEMS AND METHODS FOR ORGANIZING CONTENT USING CONTENT ORGANIZATION RULES AND ROBUST CONTENT INFORMATION

(71) Applicant: MiMedia, Inc., Brooklyn, NY (US)

(72) Inventors: Christopher Giordano, New York, NY (US); Gordon C. Mackenzie, III, Providence, RI (US); Mel Reyes, Katonah, NY (US); Nick Faulkner, New York, NY (US); Jourdan Urbach, Brooklyn, NY (US)

(73) Assignee: MiMedia, Inc., Brooklyn, NY (US)

( * ) Notice: Subject to any disclaimer, the term of this patent is extended or adjusted under 35 U.S.C. 154(b) by 238 days.

(21) Appl. No.: 13/834,589

(22) Filed: Mar. 15, 2013

(51) Int. Cl.
*G06F 7/00* (2006.01)
*G06F 17/30* (2006.01)

(52) U.S. Cl.
CPC .... *G06F 17/30289* (2013.01); *G06F 17/30153* (2013.01)

(58) Field of Classification Search
CPC ............... G06F 17/30595; G06F 17/30861; G06F 17/30312; G06F 17/30386; G06F 17/30867; G06F 17/30011; G06F 17/30424; G06F 17/30943; G06F 17/30241; G06F 17/30516; G06F 17/30864; G06F 17/30038; G06F 17/03
USPC .......................................................... 707/736
See application file for complete search history.

(56) References Cited

U.S. PATENT DOCUMENTS

| | | |
|---|---|---|
| 5,778,395 A | 7/1998 | Whiting et al. |
| 5,835,953 A | 11/1998 | Ohran |
| 5,926,624 A | 7/1999 | Katz et al. |
| 6,212,512 B1 | 4/2001 | Barney et al. |
| 6,480,867 B1 | 11/2002 | Kwan |
| 7,035,943 B2 | 4/2006 | Yamane et al. |
| 7,346,512 B2 | 3/2008 | Li-Chun Wang et al. |
| 7,509,684 B2 | 3/2009 | McDonald et al. |
| 7,660,834 B2 | 2/2010 | Cannon et al. |

(Continued)

OTHER PUBLICATIONS

Conner, N., "Using ITunes® 10", (Jan. 25, 2011), Que, p. 14 and p. 129.

(Continued)

*Primary Examiner* — Truong Vo
(74) *Attorney, Agent, or Firm* — Norton Rose Fulbright US LLP

(57) ABSTRACT

Systems and methods which provide organization of content using robust content information to enable presenting content to a user organized in a highly relevant way are disclosed. According to embodiments, a user does not control the organization of the particular content (although the user may establish some level of preferences), but rather content organization rules may be autonomously applied through analysis of robust content information and provide content organized in a thematic organizational structure which is highly relevant to the user. Such content organization rules may identify content connection points which are not readily apparent, but which nevertheless provide a collection of content which is relevant. Such content organization rules may operate to provide organization of content related through a thematic thread, such as may comprise a temporal aspect, a geographic aspect, a subject matter aspect, a content file aspect, a setting aspect, a general aspect, and/or the like.

37 Claims, 4 Drawing Sheets

(56) References Cited

U.S. PATENT DOCUMENTS

| | | |
|---|---|---|
| 7,673,240 B2 | 3/2010 | Morgan |
| 7,685,175 B2 | 3/2010 | Carroll et al. |
| 7,873,040 B2 | 1/2011 | Karlsgodt |
| 8,090,690 B2 | 1/2012 | Zamkoff et al. |
| 8,095,606 B1 | 1/2012 | Wiley et al. |
| 8,135,800 B1 | 3/2012 | Walsh et al. |
| 8,209,540 B2 | 6/2012 | Brouwer et al. |
| 8,554,735 B1 | 10/2013 | Wible et al. |
| 2002/0083366 A1 | 6/2002 | Ohran |
| 2002/0133387 A1 | 9/2002 | Wilson et al. |
| 2003/0038834 A1 | 2/2003 | Wen et al. |
| 2003/0055671 A1 | 3/2003 | Nassar |
| 2003/0098894 A1 | 5/2003 | Sheldon et al. |
| 2004/0158546 A1 | 8/2004 | Sobel et al. |
| 2004/0177319 A1 | 9/2004 | Horn |
| 2004/0193672 A1 | 9/2004 | Samji et al. |
| 2004/0236859 A1 | 11/2004 | Leistad et al. |
| 2005/0071392 A1 | 3/2005 | Sandorfi et al. |
| 2005/0102635 A1 | 5/2005 | Jiang et al. |
| 2005/0108253 A1 | 5/2005 | Metsatahti et al. |
| 2005/0114595 A1 | 5/2005 | Karr et al. |
| 2005/0131902 A1 | 6/2005 | Saika |
| 2005/0138066 A1 | 6/2005 | Finke-Anlauff et al. |
| 2005/0223277 A1 | 10/2005 | Ballard |
| 2006/0015637 A1 | 1/2006 | Chung |
| 2006/0036611 A1 | 2/2006 | Rothschild |
| 2006/0155790 A1 | 7/2006 | Jung et al. |
| 2006/0161635 A1 | 7/2006 | Lamkin et al. |
| 2006/0179079 A1 | 8/2006 | Kolehmainen |
| 2006/0195512 A1 | 8/2006 | Rogers et al. |
| 2006/0224602 A1 | 10/2006 | Rawat et al. |
| 2006/0230440 A1 | 10/2006 | Wu et al. |
| 2006/0242325 A1 | 10/2006 | Ramaswamy et al. |
| 2006/0277123 A1 | 12/2006 | Kennedy et al. |
| 2006/0288168 A1 | 12/2006 | Stevenson |
| 2006/0291720 A1 | 12/2006 | Malvar et al. |
| 2007/0048714 A1 | 3/2007 | Plastina et al. |
| 2007/0055993 A1 | 3/2007 | Braun et al. |
| 2007/0088678 A1 | 4/2007 | Farago et al. |
| 2007/0106714 A1 | 5/2007 | Rothbarth |
| 2007/0122111 A1 | 5/2007 | Yamamoto et al. |
| 2007/0130400 A1 | 6/2007 | Reisman |
| 2007/0288536 A1 | 12/2007 | Sen et al. |
| 2007/0296581 A1 | 12/2007 | Schnee et al. |
| 2008/0022058 A1 | 1/2008 | Nadathur et al. |
| 2008/0040139 A1 | 2/2008 | Pousti et al. |
| 2008/0060069 A1 | 3/2008 | Vindici |
| 2008/0082678 A1 | 4/2008 | Lorch et al. |
| 2008/0109414 A1 | 5/2008 | Chun et al. |
| 2008/0115071 A1 | 5/2008 | Fair |
| 2008/0126303 A1 | 5/2008 | Park et al. |
| 2008/0133622 A1 | 6/2008 | Brown et al. |
| 2008/0222734 A1 | 9/2008 | Redich et al. |
| 2008/0250190 A1 | 10/2008 | Johnson |
| 2008/0270395 A1 | 10/2008 | Gossweiler, III et al. |
| 2008/0294453 A1 | 11/2008 | Baird-Smith et al. |
| 2008/0306872 A1 | 12/2008 | Felsher |
| 2008/0307314 A1 | 12/2008 | Cisler et al. |
| 2008/0319856 A1 | 12/2008 | Zito et al. |
| 2009/0006643 A1 | 1/2009 | Lee |
| 2009/0019486 A1 | 1/2009 | Kalaboukis |
| 2009/0022129 A1 | 1/2009 | Karaoguz et al. |
| 2009/0024675 A1 | 1/2009 | Hewitt et al. |
| 2009/0132921 A1 | 5/2009 | Hwangbo et al. |
| 2009/0178003 A1 | 7/2009 | Fiedler |
| 2009/0240735 A1 | 9/2009 | Grandhi et al. |
| 2009/0252033 A1 | 10/2009 | Ramakrishnan et al. |
| 2009/0282336 A1 | 11/2009 | Lindley et al. |
| 2009/0327904 A1 | 12/2009 | Guzak et al. |
| 2010/0094728 A1 | 4/2010 | Denning et al. |
| 2010/0180213 A1* | 7/2010 | Karageorgos et al. ........ 715/753 |
| 2010/0241731 A1 | 9/2010 | Du et al. |
| 2010/0325549 A1 | 12/2010 | Gibson et al. |
| 2011/0004683 A1 | 1/2011 | Kottomtharayil et al. |
| 2011/0060994 A1 | 3/2011 | Maxwell et al. |
| 2011/0060998 A1 | 3/2011 | Schwartz et al. |
| 2011/0106910 A1 | 5/2011 | Grasset |
| 2011/0243534 A1 | 10/2011 | Thomas et al. |
| 2012/0072956 A1 | 3/2012 | Thomas et al. |
| 2012/0210220 A1 | 8/2012 | Pendergast et al. |
| 2012/0210351 A1 | 8/2012 | Nukala et al. |
| 2012/0265604 A1 | 10/2012 | Corner et al. |
| 2012/0330963 A1 | 12/2012 | Bartholomew |
| 2013/0024582 A1 | 1/2013 | Rodrigues |
| 2013/0061131 A1 | 3/2013 | Zito et al. |
| 2013/0066856 A1 | 3/2013 | Ong et al. |
| 2013/0173531 A1 | 7/2013 | Rinearson et al. |
| 2014/0188890 A1 | 7/2014 | Clifton et al. |

OTHER PUBLICATIONS

Linder, "Humyo offers 30GB of free online storage", Jun. 25, 2008, [retrieved on Jul. 23, 2013], retrieved from the Internet: URL: http://downloadsquad.switched.com/2008/06/25/humyor-offers-30gb-of-free-online-storage/, 1 page.

W3Schools.com, "AJAX Introduction", Apr. 19, 2010, [retrieved on Jul. 24, 2013], retrieved from the Internet: URL: http://web.archive.org/web/20100419011010/http://www.w3schools.com/ajax/ajax_intro.asp/, p. 1-2.

International Search Report and Written Opinion issued for PCT/US2010/036105, dated Jul. 13, 2010, 11 pages.

Apple Inc., "iTunes 8", © 2009, ver. 8.2.1.6, p. 1-14.

Pash, "Huymo Provides 30GB of Free Online Storage", Jun. 25, 2008, [retrieved from the Internet on Oct. 22, 2014], <URL http://lifehacker.com/397108/humyo-provides-30gb-of-free-online-storage/>, p. 1-9.

Unpublished U.S. Appl. No. 13/103,744 to Wible, et al., filed May 9, 2011 and entitled "Centralized Music Media Gallery."

Newman, "Amazon Cloud Drive and Cloud Player: A Hands-On Tour", Mar. 29, 2011, <URL http://www.pcworld.com/article/223604/Amazon_Cloud_Drive_and_Cloud_Player_A_Hands_On_Tour.html/>, p. 1-3.

Apple, Inc., "ITunes 8", (C)2009, ver.8.2.1.6, p. 1-17.

* cited by examiner

SYSTEMS AND METHODS FOR ORGANIZING CONTENT USING CONTENT ORGANIZATION RULES AND ROBUST CONTENT INFORMATION

CROSS-REFERENCE TO RELATED APPLICATIONS

The present application is related to co-pending and commonly assigned U.S. patent application Ser. No. 13/103,693 entitled "Systems and Methods for Data Upload and Download," filed May 9, 2011, Ser. No. 13/103,720 entitled "Centralized Media Access Portal," filed May 9, 2011, and Ser. No. 14/493,041 entitled "Systems and Methods for Providing Dynamically Updated Image Sets for Applications," filed Dec. 17, 2012, the disclosures of which are incorporated herein by reference.

TECHNICAL FIELD

The invention relates to the organizing of content, such as digital photographs, videos, sound files, documents, etc., using content organization rules and robust content information associated with the content, such as content metadata, analysis of the content subject matter, analysis of the content user, etc., to enable presenting relevant content to a user.

BACKGROUND OF THE INVENTION

With the proliferation of consumer electronics, such as personal computers having document generation and media content capabilities, digital video recorders, digital cameras, digital recorders, and smart devices having image and/or sound recording features readily available to capture various content, and personal digital media players and smart devices having image and/or sound reproduction features almost omnipresent to provide playback of the various content, the instances of digital media content created by and available to users is quite large. A user may, for example, generate and store numbers of digital documents, photographs, videos, sound files, etc.

Unfortunately, however, the organizational techniques employed for storing and thus later accessing such digital media content tends to be manual and relatively simplistic. For example, a user may employ a simple hierarchical folder or directory (collectively referred to herein as folders) structure in which various digital media content is associated only through their inclusion in a same folder. The level of organizational granularity provided with respect to such folders is typically not detailed (e.g., "my trip to Europe", "work documents", "videos", etc.). Implementing a fine level of granularity for content organizational structure using such folders is often not practical, requiring significant time to navigate the hierarchical folders and to manually sort the content. Moreover, such organizational structures are static, leaving the content in the folders, and thus associated with the other content of the particular folder, unless and until the user takes steps to manually reorganize the folders.

Accordingly, the use of such digital media content is often not fulfilling and generally diminishes with time. For example, the time required to access content of interest is sometimes impractical, and even more so with the passage of time. With the stagnant nature of the content and its organization, the user often loses interest in the content as time goes on. Moreover, the lack of spontaneity in current data and media retrieval technologies produces a barrier to entry for personal content enjoyment for the end-user.

Various data aggregators have been developed to deliver external content (e.g., content from sources other than the user and the user's devices), such as commercially produced news and information. Such data aggregators merely provide external content based upon key words, phrases, and other search criteria established by the user or on the user's behalf. The content aggregated by the data aggregators is not associated with the user's own digital media content and does nothing to improve or otherwise supplement the user's experience with respect to their own digital media content.

BRIEF SUMMARY OF THE INVENTION

The present invention is directed to systems and methods which provide organization of content using robust content information to enable presenting content to a user organized in a highly relevant and personally meaningful way. Embodiments of the invention may provide organization of various forms of content including digital photographs, videos, sound files, documents, and/or the like. Various content information may be utilized to provide information for organizing content in a highly relevant way to the user. For example, information such as content metadata, various attributes of the content, various attributes of the content files, content subject matter determined by analysis of the content, etc. may be analyzed to facilitate organization of content according to embodiments herein. The content information used in organizing content according to embodiments is robust, going beyond information directly available from the content being organized. For example, robust content information herein may include information regarding the content user determined from analysis of the content, information regarding a user's content library, the user's utilization of or access to content, etc.

In operation according to embodiments of the invention, a user does not control the organization of the particular content, but rather systems and methods herein autonomously operate to analyze robust content information and provide content organized in a organizational structure which is highly relevant to the user. For example, a content organizing system may be provided in association with a mass storage system providing storage of user content. The organizing system may apply content organization rules to analyze the content and/or information associated therewith to organize content for presentation to a user. The organized content may be presented to a user through a collection display media interface.

Content organization rules implemented by embodiments herein may identify content connection points which are not readily apparent, but which nevertheless provide a collection of content which is relevant. For example, content organization rules may operate to provide organization of content related, at least in part, through a thematic thread, such as may comprise a temporal aspect, a geographic aspect, a subject matter aspect, a content file aspect, a setting aspect, a general aspect, and/or the like.

The content organized for presenting to a user according to embodiments of the invention is not limited to the user's own content. For example, embodiments herein may utilize the aforementioned robust content information to identify extended content to be included with the user's own content to provide a thematic collection relevant to the user's content, the user's particular interests, etc. Such extended content according to embodiments is content from sources other than the user and the user's devices (e.g., commercially produced digital photographs, videos, sound files, documents, etc., digital media content provided by various individuals other than the user, and/or the like) which are determined to be relevant to the user's content as organized. This extended content may thus be utilized to supplement the user's own content to provide content organization which provide renewed interest in the user's content to the user.

The content organizations provided according to embodiments of the invention may be dynamic. Accordingly, embodiments may periodically or aperiodically organize different content, whether the user's own content and/or extended content, to present content to a user in a highly relevant organizational structure which remains fresh to the user. A user may thus discover and rediscover various content through operation of embodiments herein. Moreover, by introducing spontaneity into the personal media consumption experience, embodiments of the invention encourage the user to explore and re-discover their digital history in ways they never have been able to with prior solutions.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
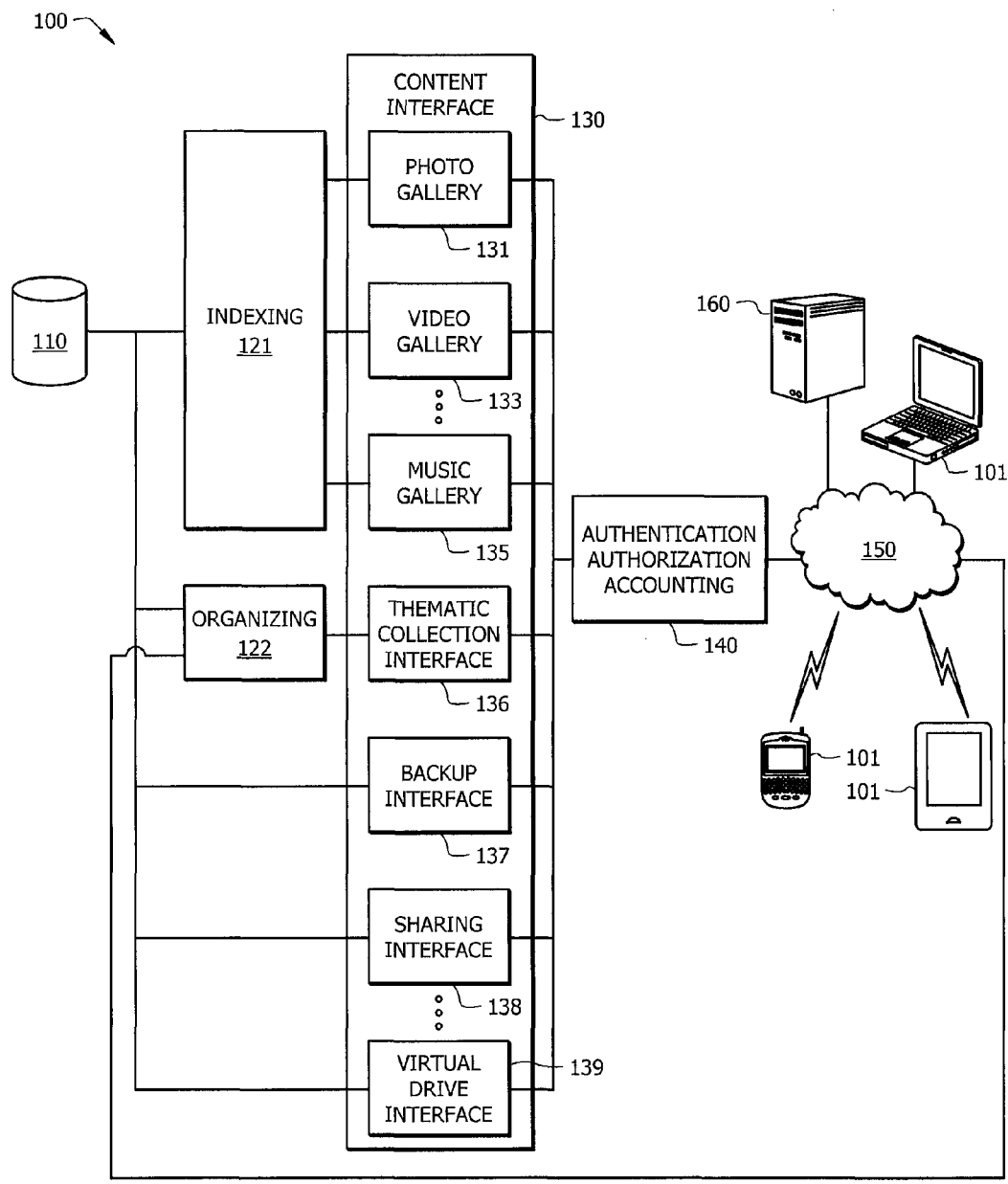
FIG. 1 shows a high level block diagram of a system adapted to provide organization of content using content organization rules for presenting one or more thematic collection to a user according to embodiments of the present invention.

FIG. 1 shows a high level block diagram of system 100 adapted to provide organization of content using content organization rules for presenting one or more thematic collection to a user according to embodiments of the present invention. It should be appreciated that systems operable according to the concepts herein may comprise various configurations of digital media content storage, including local content storage, remote content storage, centralized content storage, distributed content storage, etc., wherein the content may comprise digital media content such as digital music, digital video, digital photos, multimedia files, digital books, office productivity files according to embodiments of the invention. The illustrated embodiment shows a network based mass storage configuration, such as may provide centralized storage of and access to users' libraries of content, such as may comprise the centralized media platform provided by MiMedia, Inc., Brooklyn, N.Y.

System 100 of the illustrated embodiment is shown coupled to network 150, such as may comprise a local area network (LAN), metropolitan area network (MAN), wide area network (WAN), wireless network (e.g., wireless local area network (WLAN), wireless metropolitan area network (WMAN), cellular network, etc.), the Internet, and/or the like, providing multiplatform access by user devices 101 to digital media content stored by database 110. Such user devices for which accessibility to digital media is provided may include, for example, personal computers (PCs), personal entertainment systems (PESs), personal digital assistants (PDAs), personal communication systems (PCSs), tablet devices, console devices, gaming devices, televisions, set top boxes, automobiles with media infrastructure, media display devices, etc. The access to digital media content provided to user devices 101 by system 100 of embodiments may be with and/or without the use of specialized clients.

Embodiments of system 100 are adapted for uploading and downloading digital media content as well as viewing and sharing digital media content with respect to a plurality of user devices. Accordingly, the illustrated embodiment of system 100 comprises database 110 for storing digital media content, indexing system 121, organizing system 122, and content interface 130 for facilitating robust access to digital media content, and authentication, authorization, and accounting (AAA) system 140 for controlling access all cooperating to provide viewing and sharing of digital media content for user devices 101 coupled to system 100 through network 150. Content interface 130 of the illustrated embodiment comprises a plurality of gallery interfaces (shown as photo gallery 131, video gallery 133, and music gallery 135) providing content type based interfaces to digital media content stored in database 110 and one or more thematic collection interface (shown as thematic collection interface 136) providing a content connection point based interface to digital media content stored in database 110. Content interface 130 of the illustrated embodiment further includes a backup interface (shown as backup interface 137) facilitating introduction of digital media content into database 110, sharing interface 138 facilitating sharing of digital media content among users and user devices, and virtual drive interface 139 facilitating user device drive emulation for digital media content storage and access.

Some or all of indexing system 121, organizing system 122, content interface 130, and AAA system 140 of embodiments herein may be implemented in software operable with respect to appropriate hardware circuitry. Accordingly, elements of embodiments of the present invention comprise code segments operable upon a computer system (e.g., a processor-based computer having memory, input/output, user interface, etc., as are well known in the art) to perform tasks as described herein. The code segments can be stored on a computer readable medium, such as random access memory (RAM), read only memory (ROM), magnetic memory, optical memory, etc., which may be accessed by a host computer system for executing the code. For example, code segments providing portions of indexing system 121, organizing system 122, content interface 130, and/or AAA system 140 may be stored on a portion of database 110 for execution by a processor (not shown) of system 100. The computer system may comprise various subsystems, such as a network interface card (NIC), disk controller, cache memory, application specific integrated circuit (ASIC), etc., utilized in cooperation with the foregoing code segments for providing operation as described herein.

According to an operational aspect of system 100 of embodiments, digital media content stored by one or more of user devices 101 are communicated to a mass storage system of system 100, thereby providing backup of such digital media content on a network based mass storage system. For example, digital media content may be backed up to database 110 of system 100 through cooperative operation of AAA system 140 and backup interface 137 of content interface 130 using techniques as shown and described in the two above referenced patent application entitled "Systems and Methods for Data Upload and Download." Communication of the digital media content, or some portion thereof, to the network based mass storage system may be automated, such as to provide for periodic file backup, backup of modified files, etc.

In operation according embodiments of the invention, AAA system 140 may authenticate a user and/or user device as an appropriate client of system 100 and provide authorization to access an account, and thus digital media content and storage space, associated with the user and/or user device. AAA system 140 may additionally or alternatively provide accounting functions, such as to generate records regarding duration of access, size (e.g., bits/bytes) of data transferred, size (e.g. bits/bytes) of data stored, type of access, etc., such as for accounting (e.g., charge for services), statistical, load balancing, and/or other purposes.

Assuming access is granted by AAA system 140, backup interface 137 may operate to receive digital media content uploaded by a user device, associate the uploaded digital media content with the appropriate user account, and store the digital media content on database 110. In operation according to a preferred embodiment, backup interface 137 causes the digital media content to be stored on database 110 in a file structure which corresponds to the file structure employed by the user device. For example, a file and folder hierarchy employed by the user device when storing the digital media content is maintained when copies of those files are stored on database 110 by backup interface 137. The digital media content may thus be accessed, such as for restoring data to a user device, in a similar manner and using a same file navigation scheme as is native to the user device from which the digital media content were provided. System 100 of embodiments, therefore, provides a network based mass storage system for digital file backup. A user device may thus subsequently access system 100, being authenticated and authorized by AAA system 140 and utilizing backup interface 137, to access copies of various digital media content stored by database 110, wherein a file navigation structure consistent with that of the user device originally providing the files is used to locate desired files.

It should be appreciated that the digital media content stored by system 100 may be accessed by any of a number of user devices (e.g., any of user devices 101), whether the same as or different from the particular user device originally storing the files. Where a particular user elects to communicate the digital media content of a plurality of user devices (e.g., a plurality of user devices 101) to system 100, all such digital media content of the user may thus be consolidated (e.g., associated with a same user account by operation of AAA system 140). Access to all such digital media content may thus be provided by system 100 to all such files to any appropriate user devices. For example, indexing system 121 and one or more gallery interface (e.g., photo gallery 131, video gallery 133, and/or music gallery 135) of content interface 130 may cooperate to provide a multiplatform interactive online media experience facilitating a cohesive, online, mobile experience to all of a user's digital media content. In operation, digital media content stored by database 110 is indexed by indexing system 121 of system 100 to facilitate ready and meaningful access to the digital media content through an appropriate ones of photo gallery 131, video gallery 133, and music gallery 135 as shown and described in the above referenced entitled "Centralized Media Access Portal."

In addition to or in alternative to providing the content type based gallery interfaces above, embodiments of the invention operate to organize the digital media content to present content to a user in a highly relevant, thematic way based on content connection points which are not based on content type (e.g., music, photographs, videos, documents, etc.). Accordingly, embodiments provide organization of various forms of content including digital photographs, videos, sound files, documents, and/or the like into thematic collections. For example, organizing system 122 of the illustrated embodiment may operate to implement content organization rules to analyze the digital media content and to generate thematic collections of digital media content which are relevant to the user. These digital media content collections may be presented to the user through thematic collection interface 136.

Figure 2:
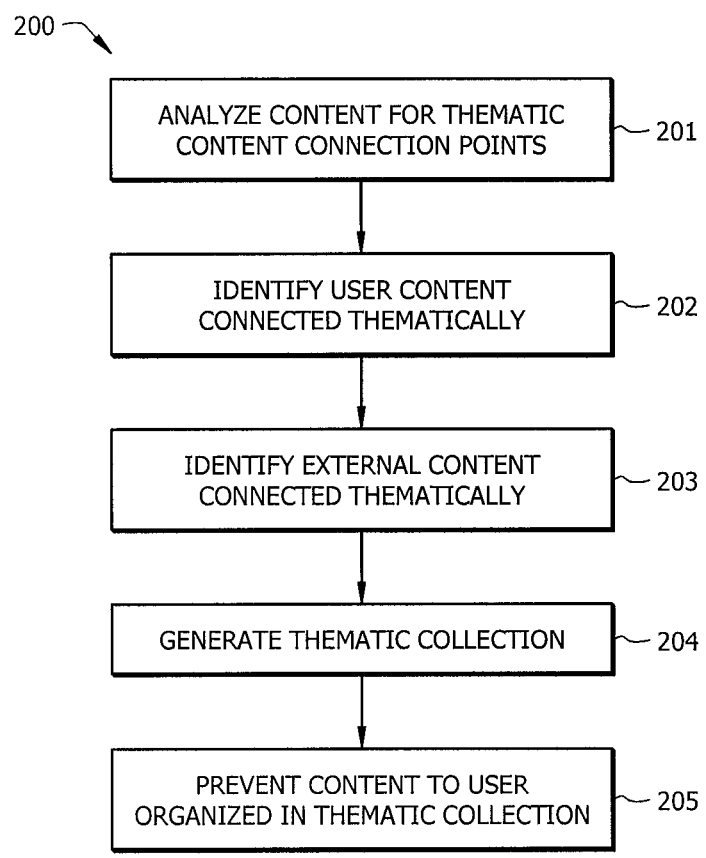
FIG. 2 shows operation of a system as shown in FIG. 1 to provide organizing of digital media content into thematic collections according to embodiments of the invention.

Flow 200 of FIG. 2 shows operation of system 100 to provide organizing of digital media content into thematic collections according to embodiments of the invention. It should be appreciated that in operation of flow 200 it is presumed that one or more libraries of user content, such as my include digital photographs, videos, sound files, documents, etc., are available for analysis and gathering into one or more thematic collection. For example, a user's digital media content libraries may be stored in database 110 (e.g., for archival backup purposes, for sharing, for multiplatform access, etc.) and made accessible to organizing system 122 of embodiments herein.

At block 201 of the illustrated embodiment, logic of organizing system 122 operates to analyze content for thematic content connection points for organizing digital media content into one or more thematic collection. For example, organizing system 122 may implement content organization rules to analyze various content information to determine whether particular digital media content has a thematic content connection point in common with other digital media content.

The content organization rules implemented according to embodiments establish a thematic thread, such as may comprise a temporal aspect, a geographic aspect, a subject matter aspect, and/or the like, for the thematic collection of digital media content. For example, a content organization rule may utilize a particular day or date (e.g., today, the user's birth date, an anniversary date, an important date in the user's profession, etc.), a particular geographic location (e.g., city, amusement park, landmark, geological feature, etc.), particular subject matter (e.g., automobiles, fishing, dining, landscape/scenery, identified person, etc.) in establishing a thematic thread.

The content organization rules may be complex, using a number of different related or unrelated aspects for establishing thematic threads. Accordingly, the content organization rules implemented according to embodiments may establish a thematic thread, at least in part, based upon aspects independent of the type or actual content of the digital media content. For example, a content organization rule may utilize a content file aspect (e.g., a level of data compression used, a resolution, a frame rate, a file size, etc.), a setting aspect (e.g., a sampling rate, a shutter speed, a focal depth, etc.), a general aspect (e.g., a luminosity level, a color tone, a sound level, etc.) in establishing a thematic thread. Such non-type and non-subject matter aspects (referred to herein as tangential aspects) may be used in combination with one or more other digital media content aspects (e.g., the afore mentioned temporal aspect, geographic aspect, and/or subject matter aspect) to establish a thematic thread herein.

The use of the foregoing tangential aspects in combination with other digital media content aspects in establishing a thematic thread according to embodiments herein facilitates not only organizing digital media content into thematic collections, but also provides thematic collections which are internally consistent. For example, although a number of photographs may meet a particular digital media content aspect (e.g., a particular day/date, a geographic area, a certain activity, etc.), all such digital media content may nevertheless not provide a unified collection due to such differences as well lighted (e.g., daytime) verses poorly lighted (e.g., nighttime) images, disparate sound levels or bass/treble balance, file/image size differences, and the like. Accordingly, tangential aspects implemented according to embodiments of the invention facilitate organizing digital media content into internally consistent thematic collections.

Organizing system 122 operates at block 201 to analyze various content information for identifying digital media content, at blocks 202 and 203, having one or more mutual content connection point for including in a thematic collection defined by the content organization rules. It should be appreciated that various content information may be utilized to provide information for identifying content connection points and organizing digital media content in thematic collections. For example, organizing system 122 may utilize information such as content metadata, various attributes of the content, various attributes of the content files, content subject matter determined by analysis of the content, etc. to identify content connection points to facilitate organization of digital media content according to embodiments herein.

Moreover, organizing system 122 may utilize information going beyond that which is directly available from the digital media content being organized. For example, information regarding the content user determined from analysis of the digital media content, information regarding a user's digital media content library, the user's utilization of or access to digital media content, etc. may provide robust content information to be analyzed by organizing system 122 for identifying content connection points and organizing the digital media content into thematic collections. As examples of robust content information available from utilization of or access to digital media content by a user, the user's tagging of a large number of photographs with a particular individual's name may suggest a strong connection with that individual and thus suggest digital media content including that individual is relevant to the user. Likewise, realization of the fact that a large portion of the user's content is generated on a particular day or in a particular geographic area may suggest a strong connection with the day or area and thus suggest digital media content related to the day or geographic area is relevant to the user.

Through application of content organization rules to robust content information, at blocks 202 and 203 organizing system 122 identifies content connection points which are not readily apparent, but which nevertheless provide a thematic collection of content. Accordingly, content organization rules may operate to provide organization of content related, at least in part, through a thematic thread, such as may comprise a temporal aspect, a geographic aspect, a subject matter aspect, a content file aspect, a setting aspect, and/or the like.

It should be appreciated that the content organized for presenting to a user according to embodiments of the invention is not limited to the user's own content, whether stored in database 110 or elsewhere. For example, embodiments herein may utilize the aforementioned content organization rules and robust content information to identify extended content to be included with the user's own content to provide a thematic gallery relevant to the user and their interests. Such extended content according to embodiments is content from sources (e.g., web server 160 coupled to network 150) other than the user and the user's devices which are determined to be relevant to the user's content as organized.

For example, digital media content comprising commercially produced digital photographs, videos, sound files, documents, etc., digital photographs, videos, sound files, documents, etc. provided by various individuals, and/or the like which are made publically available, such as through social media (e.g., FACEBOOK and TWITTER), sharing sites (e.g., PHOTOBUCKET, FLICKR, DROPBOX, and MIMEDIA), commercial sites (e.g., broadcast television and radio sites, sports franchise sites, gaming and amusement sites, news and entertainment sites, NETFLIX, and HULU), education sites (e.g., college sites), government sites (e.g., state and federal government department and office sites), and/or the like. This extended content may thus be utilized to supplement the user's own content to provide digital media content organization which provides a fresh collection of content and invokes renewed interest in the user's content to the user.

As another example, digital media content available from various content partners (e.g., sports franchises, resort properties, entertainment venues, clubs and societies, etc.) may provide extended content according to embodiments of the invention. A user may identify one or more such content partners (e.g., using a control feature or preference settings for organizing system 122) from which content of interest to the user may be identified. Thereafter, relevant or otherwise suitable content may be collected from such content partners when appropriate (e.g., when relevant to the user's interests, relevant to the day, etc.).

To aid in understanding the concepts of the present invention, a specific example of a "day in my life" thematic thread and the identification of relevant digital media content will be given. It should be appreciated however, that the concepts illustrated are applicable to any number of different thematic threads implementing different content organization rules applied with respect to various robust content information The exemplary "day in my life" thematic thread may be established for a particular user based upon a date aspect relevant to that user (e.g., birth date, anniversary date, date of a notable event, today's date, etc.) and one or more other aspects, such as daytime/nighttime, color tone (warm/cool), shutter speed, bass/treble balance, etc. In operation according to embodiments of the invention, these thematic aspects may be utilized by organizing system 122 to identify digital media content which is connected thematically through application of content organization rules to robust content information.

One or more of the foregoing thematic aspects may be determined automatically, such as through organizing system 122 analyzing the user's digital media content, the user's access and utilization of the user's digital media content, information from a user account (e.g., digital media content storage account), publically available information (e.g., through social media, public records, etc.), and/or other appropriate sources. For example, a date relevant to the user may be determined through analysis of documents stored in database 110, through analyzing the content of photographs and the dates upon which those photographs were taken (e.g., as may be included in the photograph metadata), and/or through date information provided in association with one or more user accounts. Likewise, additional aspects for the content organization rules, such as daytime/nighttime etc., may be determined by analyzing the digital media content, its metadata, and/or the user's access to or utilization of the digital media content. It should be appreciated that, where aspects of the content organization rules are determined from the digital media content itself, such aspects may be determined from the user's complete library of digital media content or from some subset thereof. For example, a first aspect of the content organization rules may be utilized to identify preliminarily qualifying digital media content (e.g., content related to the user relevant date) and this subset of digital media content may be used in determining a second aspect of the content organization rules (e.g., daytime/nighttime, color tone, etc.).

Having at least one thematic aspect of the content organization rules, organizing system 122 may analyze the user's digital media content (e.g., stored in database 110) to identify content connection points and thus preliminarily qualifying digital media content. For example, organizing system 122 may analyze digital media content metadata, the subject matter of the digital media content, the user's access to or utilization of the digital media content, etc. to determine if there is a match with the aspect (e.g., a match to the foregoing relevant date). It should be appreciated that identifying relevant digital media content through the application of such content organization rules to robust content information may implement complex logic, such as to use face and/or voice recognition to identify matching subject matter, object recognition (e.g., recognize objects such as a birthday cake, particular sporting equipment, mortarboard, etc.) to identify matching dates or events, character recognition to identify matching subject matter, and/or the like. Moreover, the logic for identifying relevant digital media content may identify less direct, but nevertheless relevant, matches. For example, through analysis of the user's digital media content library it may be determined that the user has an affinity for a particular celebrity, musical group, or sports team. Information regarding those entities (e.g., birthdates, important event dates, game schedules, album release dates, etc.) may be analyzed to determine a match and thus digital media content of that matching entity may be identified as thematically relevant. Using such techniques, user content and/or external content may be identified as thematically relevant when such digital media content directly matches one or more aspect of the content organization rules or when determined to be an indirect match to one or more aspect of the content organization rules.

Continuing with the exemplary "day in my life" thematic thread, and assuming the relevant date is the user's birth date, application of the content organization rules may identify various user digital media content which was created on the user's birth date, which includes birthday subject matter, which references the user's birth date, which was accessed or utilized by the user on the user's birth date, as having subject matter related to birth dates in general, etc. as preliminarily relevant to the thematic thread. Additionally, application of the content organization rules may identify extended content which references the user's birth date, which includes an event occurring on the user's birth date, which is of an entity having a birth date in common with the user, which relates generally to birthday celebrations, etc., as preliminarily relevant to the thematic thread.

It should be appreciated that identification of thematic relevancy is not limited to matching subject matter or subject matter event dates. For example, through analyzing the user's access to various digital media content it may be determined that the user enjoys particular music for celebrations (e.g., the user accessed music files of a particular artist on celebration dates, such as a birth date, a graduation date, etc.). Thus, logic for identifying relevant digital media content may identify such digital media content as preliminarily relevant to the thematic thread.

Having preliminarily identified a pool of user digital media content and extended digital media content as relevant, logic for identifying relevant digital media content may apply one or more additional aspect of the content organization rules to the digital media content. In operation according to embodiments, organizing system 122 may analyze the digital media content preliminarily identified as having content connection points and thus relevant to the thematic thread to determine one or more additional aspect of the content organization rules. For example, the preliminarily identified pool of digital media content may be analyzed to determine a general setting (e.g., daytime/nighttime, dark/light, etc.), a general color tone (e.g., warm/cool, colorful/muted, color/black and white, pastel/primary colors, etc.), a general intonation (e.g., bass/treble, cadence, etc.), general subject matter aspects (e.g., individual persons/groups of people, urban/rural, landscape/cityscape, etc.), file size, image resolution, image quality, sampling rate, and/or like general attributes. Such aspects may be utilized by logic of organizing system 122 to select digital media content having similar general qualities as the thematic collection to be presented to the user. Accordingly, the thematic collection may present a cohesive combination of digital media content which is visually, aurally, subject matter, quality, and technologically compatible, thereby providing a digital media content collection which is not only appealing to the user, but which is internally consistent.

Having identified the thematically relevant content, at block 204 of the illustrated embodiment organizing system 122 generates the thematic collection comprising the identified digital media content, or some portion thereof (e.g., a predetermined number of digital media content files, a predetermined aggregated data size, etc.), for presenting to the user. In operation according to embodiments, a user does not control the organization of the particular content, but rather content organization rules are applied by such embodiments through analysis of robust content information to provide content organized in a thematic organizational structure which is highly relevant to the user. However, such embodiments may nevertheless facilitate thematic collections which are relevant and desirable to the users through the use of preferences, such as may be implemented with respect to organizing system 122, which allow the users to provide input as to how their thematic collection(s) are to be generated. Such preferences may include the types of media preferred, various media attributes (e.g., size, resolution, color tone, etc.), how tightly or loosely the content connection points relate to the subject matter, and/or the like.

In operation to generate thematic collections according to embodiments of the invention, logic of organizing system 122 may generate an index to include pointers identifying each digital media content file to be included in a particular thematic collection. Additionally or alternatively, logic of organizing system 122 may create copies of one or more digital media content file (e.g., extended content), such as within database 110, to utilize in the collection (e.g., to ensure availability of the content when accessed as part of the thematic collection organized by organizing system 122).

Generation of the thematic content at block may comprise manipulation of the digital media content identified as thematically relevant. For example, logic of organizing system 122 may operate to generate modified versions of various content, such as to provide attributes (e.g., encoding, compression, frame rate, etc.) which is consistent with that of other content of the thematic collection. Additionally or alternatively, transcoders and/or other interfacing technology may be implemented (e.g., in run-time) to accommodate mismatches in attributes, such as where a user device is otherwise incapable of accessing the particular digital media content or where matching of particular attributes otherwise enhances the user experience (e.g., improves performance, provides consistency between content, etc.).

At block 205 of the illustrated embodiment, the generated thematic collection is presented to the user. For example, organizing system 122 may provide the thematic collection, or information with respect thereto (e.g., the aforementioned index information) to thematic collection interface 136 for presentation to the user via one or more of user devices 101. Once information regarding the thematic collection of digital media content is provided by organizing system 122 to thematic collection interface 136, a multiplatform interactive media experience facilitating a cohesive, online, mobile experience may be provided by thematic collection interface 136.

Figure 3A:
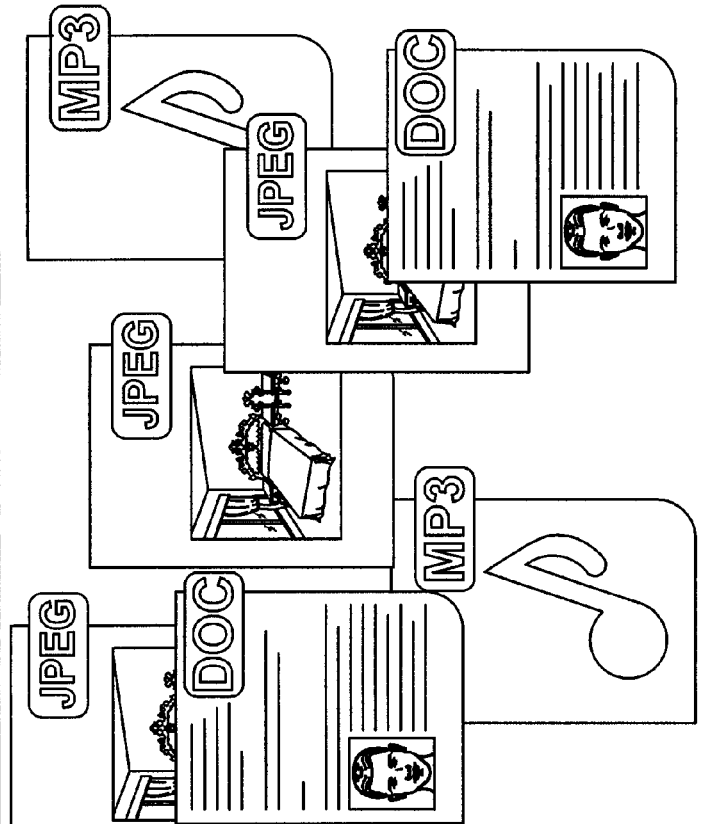
FIGS. 3A and 3B show a collection display providing access to the digital media content of a thematic collection according to embodiments of the invention.
Figure 3B:
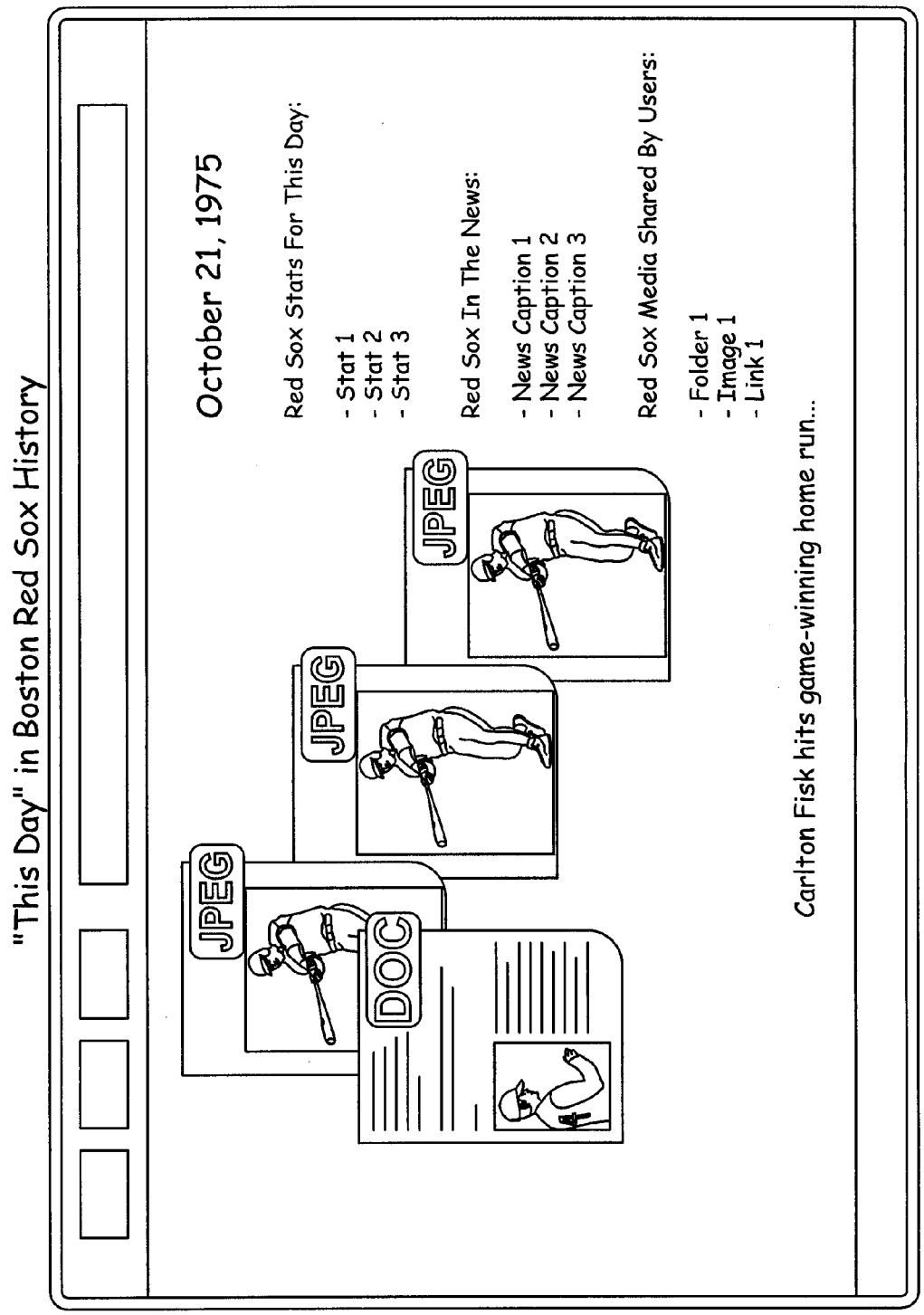

The thematic collection of digital media content may be presented to the user using a number of formats and interfacing schemes, including aggregate and historical data from both user and external (e.g. professional sports teams, musical artists, friends and family, etc.) data repositories and data feeds. The embodiment illustrated in FIGS. 3A and 3B provides access to the digital media content of a thematic collection for a given date through both a historical aggregate of user activities for that date, along with a thematic collection derived from external sources. User activities may include aggregate summaries of media uploads, media downloads, tagging media, viewing media, sharing media, or any activity or event tracked internally or available through other systems. External activities may include news feeds, public media, events, cultivated activity feeds or any data available through external systems. The aforementioned thematic collections may include the user's digital media content, extended digital media content, and/or combinations thereof. It should be appreciated that in embodiments of the invention adapted to facilitate sharing of digital media content various users other than a user providing the digital media content may be provided access to the digital media content through operation of AAA system 140 of system 100.

A thematic collection may be tailored to the user's traits, skills, etc. For example, analysis of the user's digital media content may show that the user uses relatively simple technology (e.g., "point-and-shoot" camera, minimally capable smart phone, etc.) and/or uses technology in a rudimentary way (e.g., uses less advanced features or settings) indicating that the user is not a technologically advanced user. Similarly, analysis of the user's digital media content may show that the user makes selections (e.g., use of large fonts, high contrast settings, high volume settings, etc.) indicating that the user is impaired (e.g., visual or hearing) or otherwise prefers such settings. Accordingly, thematic collection interface 136 of embodiments may implement a format or version of collection display 300 corresponding to the user's attributes (e.g., skills, aptitude, preferences, etc.).

As discussed above, extended content may include digital media content from commercial and other sources. It should be appreciated that some such digital media content may be provided in association with a fee or charge (e.g., a fee per use, a license fee, etc.). Accordingly, embodiments of content interface 130 may implement a commerce aspect to facilitate the full use and enjoyment of such digital media content. For example, thematic collection interface 136 of embodiments may include an ecommerce engine therein (e.g., logic implementing electronic financial transaction and digital goods delivery functionality) to facilitate a user purchasing various digital media content included in a thematic collection. In operation according to embodiments of the invention, a reduced version or portion (e.g. thumbnail, short clip, sample, etc.) of the digital media content requiring a fee may be included in the thematic collection to allow the user to perceive the relevance of that particular digital media content. Accordingly, through operation of embodiments of the invention the user may be introduced to digital media content which is relevant to the user (i.e., shares one or more connection point with other digital media content of the user) which the user may not otherwise have been introduced to.

From the foregoing exemplary embodiments it can be appreciated that a user need not control the organization of the particular content. Instead, logic operable in accordance with embodiments of the invention may autonomously operate to apply content organization rules, analyze robust content information with respect to digital media content, and provide content organized in a thematic collection relevant to the user.

It should be appreciated that the content organizations provided according to embodiments of the invention may be dynamic. For example, embodiments may periodically or aperiodically (e.g., daily, upon the occurrence of an event, when the user has not accessed particular content within a period of time, at predetermined times, etc.) organize different digital media content, whether the user's own content and/or extended content, to present content to a user in a highly relevant organizational structure which remains fresh to the user.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
analyzing, by logic of a digital media content organizing system in communication with a user's library of digital media content, content information associated with digital media content of the user's library to determine a set of digital media content from among the digital media content of the user's library, wherein the set of digital media content is determined by:
applying, by the logic of the digital media content organizing system, content organization rules to the content information to establish content connection points for at least a portion of the digital media content of the user's library, wherein the content connection points identify thematic associations between the portion of the digital media content of the user's library; and identifying, by the logic of the digital media content organizing system, particular digital media content having one or more mutual content connection points, wherein the set of digital media content includes the particular digital media content;

automatically generating, by the logic of the digital media content organizing system, a thematic collection of digital media content including the set of digital media content identified as having one or more mutual content connection points established by the content organization rules; and presenting, by logic of a thematic collection interface, the thematic collection of digital media content or access by the user through one or more user device.

2. The method of claim 1, wherein the digital media content organizing system is also in communication with digital media content external to the user's library, wherein the identifying particular digital media content having the one or more mutual content connection points identifies particular digital media content from the external digital media content, and wherein the generating the thematic collection of digital media content generates the thematic collection of digital media content to include the set of digital media content from the user's library and the external digital media content identified from the digital media content external to the user's library.

3. The method of claim 2, wherein the external digital media content included in the thematic collection comprises digital media content from one or more commercial source.

4. The method of claim 2, wherein the external digital media content included in the thematic collection comprises digital media content from one or more public source.

5. The method of claim 4, wherein the one or more public source includes a public source selected from the group consisting of a social media site, a file sharing site, a commercial site, an education site, and a government site.

6. The method of claim 1, wherein the content organization rules establish a thematic thread for the thematic collection, wherein the thematic thread comprises a first thematic aspect selected from the group consisting of a temporal aspect, a geographic aspect, and a subject matter aspect, and wherein the thematic thread constrains the set of digital media content included in the thematic collection such that the set of digital media content included in the thematic collection is internally consistent.

7. The method of claim 6, wherein the content organization rules comprise a plurality of thematic aspects for establishing the thematic thread.

8. The method of claim 7, wherein the thematic thread comprises a second thematic aspect selected from the group consisting of a content file aspect, a setting aspect, and a general aspect.

9. The method of claim 8, wherein the content file aspect is selected from the group consisting of a level of data compression used, a resolution, a frame rate, and a file size.

10. The method of claim 8, wherein the setting aspect is selected from the group consisting of a sampling rate, a shutter speed, and a focal depth.

11. The method of claim 8, wherein the general aspect is selected from the group consisting of a luminosity level, a color tone, and a sound level.

12. The method of claim 1, wherein the user's library includes a plurality of different types of digital media content, and wherein the thematic collection of digital media content comprises different types of digital media content including at least two types of digital media content selected from the group consisting of music, photographs, videos, and documents.

13. The method of claim 12, wherein the content connection points are not based on content type.

14. The method of claim 1, wherein the thematic collection interface presents the thematic collection of digital media content in a plurality of galleries.

15. The method of claim 14, wherein the galleries comprise content type based galleries subdividing the thematic collection of digital media content by content type.

16. The method of claim 1, wherein the thematic collection interface provides multiplatform access by one or more user device to digital media content.

17. A system comprising:
a digital media content organizing system in communication with a user's library of digital media content, the digital media content organizing system having one or more processor configured to:
analyze content information associated with digital media content of the user's library to determine a set of digital media content from among the digital media content of the user's library, wherein the set of digital media content is determined by:
applying content organization rules to the content information to establish content connection points for at least a portion of the digital media content of the user's library, wherein the content connection points identify thematic associations between the portion of the digital media content of the user's library; and
identifying particular digital media content having one or more mutual content connection points, wherein the set of digital media content includes the particular digital media content;
automatically generate a thematic collection of digital media content including the set of digital media content identified as having content one or more mutual content connection points established by the content organization rules; and
a thematic collection interface having logic adapted to present the thematic collection of digital media content for access by the user through one or more user device.

18. The system of claim 17, wherein the digital media content organizing system is also in communication with digital media content external to the user's library, and wherein the logic of the digital media content organizing system identifies particular digital media content from the external digital media content to thereby generate the thematic collection of digital media content including the set of digital media content from the user's library and the identified external digital media content.

19. The system of claim 18, wherein the external digital media content included in the thematic collection comprises digital media content from one or more commercial source.

20. The system of claim 18, wherein the external digital media content included in the thematic collection comprises digital media content from one or more public source.

21. The system of claim 20, wherein the one or more public source includes a public source selected from the group consisting of a social media site, a file sharing site, a commercial site, an education site, and a government site.

22. The system of claim 17, wherein the content organization rules establish a thematic thread for the thematic collection, and wherein the thematic thread comprises a first thematic aspect selected from the group consisting of a temporal aspect, a geographic aspect, and a subject matter aspect, and wherein the thematic thread constrains the set of digital media content included in the thematic collection such that the set of digital media content included in the thematic collection is internally consistent.

23. The system of claim 22, wherein the content organization rules comprise a plurality of thematic aspects for establishing the thematic thread.

24. The system of claim 23, wherein the thematic thread comprises a second thematic aspect selected from the group consisting of a content file aspect, a setting aspect, and a general aspect.

25. The system of claim 24, wherein the content file aspect is selected from the group consisting of a level of data compression used, a resolution, a frame rate, and a file size.

26. The system of claim 24, wherein the setting aspect is selected from the group consisting of a sampling rate, a shutter speed, and a focal depth.

27. The system of claim 24, wherein the general aspect is selected from the group consisting of a luminosity level, a color tone, and a sound level.

28. The system of claim 17, wherein the user's library includes a plurality of different types of digital media content, and wherein the thematic collection of digital media content comprises different types of digital media content including at least two types of digital media content selected from the group consisting of music, photographs, videos, and documents.

29. The system of claim 28, wherein the content connection points are not based on content type.

30. The system of claim 17, wherein the thematic collection interface presents the thematic collection of digital media content in a plurality of galleries.

31. The system of claim 30, wherein the galleries comprise content type based galleries subdividing the thematic collection of digital media content by content type.

32. The system of claim 17, wherein the thematic collection interface provides multiplatform access by one or more user device to digital media content.

33. A method comprising:
analyzing, by logic of a digital media content organizing system in communication with a user's library of digital media content and also in communication with digital media content external to the user's library, first content information associated with digital media content of the user's library and second content information associated with the digital media content external to the user's library to generate a thematic collection including a set of digital media content, wherein the set of digital media content is determined by:
applying content organization rules to the first content information and the second content information to establish content connection points for at least a portion of the digital media content of the user's library and the digital media content external to the user's library, wherein the content connection points identify thematic associations between the portion of the digital media content of the user's library and the digital media content external to the user's library, wherein the content connection points are not based on content type, and wherein the user's library and the digital media content external to the user's library include a plurality of different types of digital media content; and
identifying, by logic of the digital media content organizing system, particular digital media content having one or more mutual content connection points, wherein the set of digital media content includes the particular digital media content, and wherein the particular digital media content includes identified ones of the digital media content of the user's library and identified ones of the digital media content external to the user's library;
automatically generating, by the logic of the digital media content organizing system, a thematic collection of digital media content including the set of digital media content identified as having one or more mutual content connection points established by the content organization rules, wherein the set of digital media content included in the thematic collection of digital media content includes digital media content from the user's library and digital media content external to the user's library to thereby comprise external digital media content, and wherein the thematic collection of digital media content comprises different types of digital media content including at least two types of digital media content selected from the group consisting of music, photographs, videos, and documents; and
presenting, by logic of a thematic collection interface, the thematic collection of digital media content for access by a user through one or more user device.

34. The method of claim 33, wherein the external digital media content included in the thematic collection comprises digital media content from one or more commercial source, one or more public source, or a combination thereof.

35. The method of claim 33, wherein the method includes:
determining a technology trait associated with the user, wherein the technology trait indicates a sophistication level associated with one or more devices that were used by the user to generate the digital media content of the user's library, a sophistication level of one or more settings of the one or more devices, or a combination thereof; and
tailoring the thematic collection based on the technology trait.

36. The method of claim 33, wherein the content organization rules comprise a plurality of thematic aspects for establishing a thematic thread, and wherein the thematic thread constrains the set of digital media content included in the thematic collection such that the set of digital media content included in the thematic collection is internally consistent.

37. The method of claim 36, wherein the thematic thread comprises a first thematic aspect selected from the group consisting of a temporal aspect, a geographic aspect, and a subject matter aspect, and wherein the thematic thread comprises a second thematic aspect selected from the group consisting of a content file aspect, a setting aspect, and a general aspect, and wherein the set of digital media content is internally consistent when each digital media content included in the thematic collection has the first thematic aspect.

* * * * *